UNITED STATES PATENT OFFICE.

ZACHARIAS OLSSON, OF RIVER VIEW, HAMPTON HILL, ENGLAND, ASSIGNOR TO GUMMI (U. S. A.) LIMITED, OF LONDON, ENGLAND.

MANUFACTURE OF ELASTIC MATERIALS.

1,061,111.      Specification of Letters Patent.      Patented May 6, 1913.

No Drawing.      Application filed December 10, 1912. Serial No. 735,952.

*To all whom it may concern:*

Be it known that I, ZACHARIAS OLSSON, a subject of the King of Sweden, residing at River View, Hampton Hill, in the county of Middlesex, England, have invented certain new and useful Improvements in the Manufacture of Elastic Materials, of which the following is a specification.

This invention relates to improvements in the manufacture of elastic materials having properties similar in many respects to indiarubber and suitable as a substitute for indiarubber in some of its applications, and its relates more especially to improvements in the elastic material prepared in accordance with the specification of Letters Patent No. 954,991, granted to me.

According to the present invention there is stirred in with the fluid mixture of gelatinous material (such as glue or gelatin) and hygroscopic material (such as glycerin or calcium chlorid) a quantity of mineral oil and of dry dextrin, sugar, starch or other suitable carbohydrate which will take up the water in the mixture and permit the oil to permeate the mass in an evenly distributed manner. The proportions of the oil and dextrin may vary but suitable quantities are 10 to 30 kilograms of oil to 30 kilograms each of gelatin and glycerin. The weight of dextrin may be about one half that of the oil and the oil and dextrin are first thoroughly mixed together before stirring into the gelatinous mixture. This addition is made before the introduction of the bichromate, the action of which is controlled by adding to the fluid mixture an opaque coloring matter, so that the effect of light is partly neutralized and excessive or too rapid hardening prevented. The controlling coloring matter may be mixed in with the mineral oil and carbohydrate.

As a controlling coloring matter lamp black, cinnabar, ocher, ultramarine, anilin colors or like opaque materials may be employed. The bichromate is added, either with or after the coloring matter and in a proportion of from 0.4 to 1.5% by weight of the gluey or gelatinous substance. Owing to the retarding action of the opaque coloring matter the resultant material can be readily cast in molds and will solidify into a homogeneous resilient body which retains its elasticity indefinitely. It is also proposed to incorporate in the fluid mixture a quantity of strengthening fibrous material. The fibrous material may be in the form of cellulose, hair, spun glass or such like substances which increase the strength of the elastic body finally formed without impairing its resiliency. It is preferably mixed in with glycerin and in about one part in ten by weight of the total material, but the proportions may be varied as found desirable for different purposes. The addition of oil and carbohydrate should be made after the fiber and glycerin have been added to the gelatinous material.

The mixing of the various ingredient is conveniently carried out in open pans heated by steam to a temperature of about 75°–80° C.

What I claim as my invention and desire to secure by Letters Patent of the United States is:—

1. A process for the manufacture of an elastic material consisting in mixing together gelatinous and hygroscopic substances in liquid form and in adding to such liquid mixture mineral oil and a carbohydrate adapted to take up the water in the mixture and to permit the mineral oil to permeate the mixture and in afterward adding a bichromate adapted to harden the mixture.

2. A process for the manufacture of an elastic material consisting in mixing together gelatinous and hygroscopic substances in liquid form, adding a quantity of fibrous strengthening material thereto and incorporating in such liquid mixture mineral oil and a corbohydrate mixed with such oil and adapted to take up the water in the mixture and to permit the mineral oil to permeate the mixture and in afterward adding a bichromate adapted to harden the mixture.

3. An elastic material composed of a mixture of gelatinous and hygroscopic substances, mineral oil and a carbohydrate adapted to take up the water in the mixture and to permit the mineral oil to permeate the mixture, to which is added a bichromate adapted to harden the mixture.

4. An elastic material composed of a mixture of gelatinous and hygroscopic substances, fibrous strengthening material, opaque coloring matter, mineral oil and a carbohydrate adapted to take up the water in the mixture and to permit the mineral oil to permeate the mixture, to which is added a bichromate adapted to harden the mixture under the control of the coloring matter.

In testimony whereof I affix my signature in presence of two witnesses.

ZACHARIAS OLSSON.

Witnesses:
T. SELBY WARDLE,
W. I. SKERTEN.